US009860947B2

(12) United States Patent
Dunser

(10) Patent No.: US 9,860,947 B2
(45) Date of Patent: Jan. 2, 2018

(54) DRIVER CIRCUIT FOR ILLUMINANTS, PARTICULARLY LEDS

(71) Applicant: Tridonic GmbH & Co KG, Dornbirn (AT)

(72) Inventor: Mathias Dunser, Feldkirch (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 15/100,451

(22) PCT Filed: Nov. 27, 2014

(86) PCT No.: PCT/EP2014/075734
§ 371 (c)(1),
(2) Date: May 31, 2016

(87) PCT Pub. No.: WO2015/082288
PCT Pub. Date: Jun. 11, 2015

(65) Prior Publication Data
US 2016/0302268 A1 Oct. 13, 2016

(30) Foreign Application Priority Data

Dec. 3, 2013 (DE) .......................... 10 2013 224 749

(51) Int. Cl.
H05B 33/08 (2006.01)
H05B 37/02 (2006.01)
(52) U.S. Cl.
CPC ......... *H05B 33/083* (2013.01); *H05B 33/089* (2013.01); *H05B 33/0815* (2013.01);
(Continued)
(58) Field of Classification Search
None
See application file for complete search history.

(56) References Cited

U.S. PATENT DOCUMENTS 7,990,070 B2 * 8/2011 Nerone ................... H02M 1/32
315/224
8,575,849 B2 * 11/2013 Simi .................. H05B 33/0815
315/219
(Continued)

OTHER PUBLICATIONS

International Search Report and Written Opinion issued in connection with the corresponding International Application No. PCT/EP2014/075734 dated Feb. 5, 2015.
(Continued)

Primary Examiner — Douglas W Owens
Assistant Examiner — James H Cho
(74) Attorney, Agent, or Firm — The H.T. Than Law Group

(57) ABSTRACT

The invention proposes a driver circuit (1, 20) for illuminants, particularly LEDs, having: —a circuit (2), such as an inverter in the form of a half-bridge circuit that has a resonant circuit (3), that is clocked by means of at least one switch (FET1, FET2), —a transformer (L2) that follows the resonant circuit (3) and from whose secondary winding (L2b) the illuminants can be supplied with power, and —a control circuit (ST) that clocks the switches (FET1, FET2) of the clocked circuit (2), wherein an actual signal (ILED_PRIM) that indirectly reproduces the current through the illuminants and that is inductively output on the secondary side (L2/2) of the transformer (L2) is fed back to the control circuit (ST), wherein the control circuit (ST) is designed: —to regulate the current through the illuminants by clocking at least one switch (FET1, FET2) of the clocked circuit (2) on the basis of the actual signal (ILED_PRIM), and/or —to use the actual signal (ILED_PRIM) to record a fault state following the secondary winding (L2b) of the transformer (L2) and/or the illuminants and to take this as a basis for outputting a fault signal and/or for altering the actuation of the clocked circuit (2).

14 Claims, 2 Drawing Sheets

(52) U.S. Cl.
CPC ..... *H05B 33/0842* (2013.01); *H05B 33/0884* (2013.01); *H05B 37/0281* (2013.01); *H05B 33/0845* (2013.01); *Y02B 20/348* (2013.01)

(56) References Cited

U.S. PATENT DOCUMENTS

| | | | |
|---|---|---|---|
| 9,203,321 B1* | 12/2015 | Xiong | H05B 33/0809 |
| 2007/0024254 A1 | 2/2007 | Radecket et al. | |
| 2009/0219007 A1* | 9/2009 | Ushijima | G01R 15/185 |
| | | | 324/72 |
| 2009/0273301 A1 | 11/2009 | De Anna et al. | |
| 2009/0316454 A1 | 12/2009 | Colbeck et al. | |
| 2010/0301766 A1 | 2/2010 | Zudrell-Kocj et al. | |
| 2010/0283398 A1 | 11/2010 | Sah | |
| 2011/0080102 A1 | 4/2011 | Ge et al. | |
| 2012/0293072 A1 | 11/2012 | Chang et al. | |
| 2013/0127348 A1 | 5/2013 | Yang | |
| 2013/0250627 A1 | 9/2013 | Herfurth | |
| 2014/0203714 A1* | 7/2014 | Zhang | H05B 33/0809 |
| | | | 315/185 R |
| 2015/0002032 A1 | 1/2015 | Zudrell-Koch et al. | |

OTHER PUBLICATIONS

Austrian Search Report issued in connection with the corresponding Austrian Patent Application No. GM 411/2013 dated Mar. 2, 2016.

* cited by examiner

DRIVER CIRCUIT FOR ILLUMINANTS, PARTICULARLY LEDS

FIELD OF THE INVENTION

The present invention relates to a converter for the operation of at least one illuminant, especially a driver circuit for the operation of at least one LED.

BACKGROUND OF THE INVENTION

Driver circuits for the operation of LEDs are known in principle from the prior art. Such a driver circuit is supplied from an electrical power source and comprises a resonant circuit, for example, an LLC converter which is responsible for transmitting current via a galvanic separation or respectively galvanic barrier from a primary side to a secondary side of the galvanic barrier. The purpose of this transmission of electrical energy is to supply an LED series connected to the secondary side with current.

It is known that such a resonant circuit or respectively such a driver circuit is operated as a constant-current converter. For this purpose, a control loop can be provided for the control of the LED current, wherein an actual value of the LED current can be measured on the secondary side of the galvanic barrier. However, this actual-value measurement must be fed back to a primary-side control loop or respectively a primary side control circuit, in order to control the driver circuit correspondingly. The disadvantage with this embodiment is the fact that the feeding back of the actual value of the LED current to the primary-side control circuit requires a potential separation and consequently an optocoupler.

Accordingly, attempts have already been made in the prior art to dispense with a secondary-side detection of the LED current and to detect the value of the current indirectly via the current on the primary side of the transformer. Starting from this feedback value, a current control is implemented, in which a corresponding switch of a half-bridge circuit of the driver circuit is varied.

However, even such embodiments are not satisfactory. In particular, this detection on the primary side has the disadvantage that it does not directly reproduce the LED current, but, on the contrary, also comprises the variable component of the magnetisation current on the primary side. This component is variable and depends, in particular, upon the LED voltage, which, in turn, is dependent, for example, upon the number of LEDs. A fixed compensation of the magnetisation current cannot therefore take place. On the contrary, a direct measurement of the LED voltage is necessary for the compensation, which, however, in turn, requires an AD converter and a feedback via an optocoupler to the control circuit on the primary side.

SUMMARY OF THE INVENTION

The invention is based upon the technical problem of specifying a circuit or respectively an LED converter for the operation of an LED series and a corresponding operating method, in which the primary-side control can be improved and, in particular, the disadvantages named above can be removed.

This problem underlying the invention is now solved by the combination of the features of the independent claims. The dependent claims advantageously develop the central idea of the invention further.

The basic idea of the invention is to cause indirectly a secondary-side transformer detection of the LED current, in that a transformer decoupling is implemented in the region of the secondary-side, in particular, between the secondary side of the transformer and the rectification.

According to a first aspect of the invention, a driver circuit is provided for illuminants, especially LEDs. The driver circuit comprises a circuit clocked by means of at least one switch, for example, an inverter in the form of a half-bridge circuit, which feeds a resonant circuit. The driver circuit comprises a transformer following the resonant circuit, starting from the secondary winding of which the illuminants can be supplied. The driver circuit comprises a control circuit which clocks the switches of the clocked circuit.

An actual signal indirectly reproducing the current through the illuminant is fed back to the control circuit, which is inductively decoupled on the secondary side of the transformer.

The control circuit is embodied to clock at least one switch of the clocked circuit dependent upon the actual signal for the control of the current through the illuminant.

Alternatively, or additionally to this, the control circuit is embodied to detect an error status on the basis of the actual signal following the secondary winding of the transformer—that is, an error status on the secondary side of the transformer—and/or of the illuminant, and dependent upon this, to output an error signal and/or to vary the control of the clocked circuit.

According to a further aspect of the invention, an LED module is provided, comprising such a driver circuit and at least one LED series supplied from the driver circuit, which comprises at least one LED.

According to a further aspect of the invention, a luminaire, for example, an LED luminaire is provided. The luminaire comprises such a driver circuit. The luminaire further comprises a rectifier connected upstream for the rectification of a mains voltage and a DC/DC converter, for example, in the form of a power-factor-correction circuit for the supply of the driver circuit starting from the rectified mains voltage.

According to a further aspect of the invention, a method is provided for the control of the current through an illuminant series, with the use of a driver circuit. The driver circuit in this context comprises a circuit clocked by means of at least one switch, for example, a half-bridge circuit, which feeds a resonant circuit. The driver circuit comprises a transformer following the resonant circuit, starting from the secondary winding of which the illuminants are supplied. The driver circuit further comprises a control circuit which clocks the switches of the clocked circuit.

An actual signal indirectly reproducing the current through the illuminants is fed back to the control circuit, which is inductively decoupled on the secondary side of the transformer.

The control circuit controls the current through the illuminants corresponding to this actual signal by clocking the clocked circuit dependent upon the actual signal.

Alternatively, or additionally to this, the control circuit detects an error status on the basis of the actual signal on the secondary side of the transformer and/or an error status of the illuminants.

Dependent upon the latter, the control circuit outputs an error signal and/or it varies the control of the clocked circuit.

By preference, the secondary winding of the transformer feeds a rectifier circuit, and the actual signal is decoupled before the rectification.

By preference, the rectifier circuit is embodied as a full-bridge rectifier or mid-point rectifier.

By preference, the driver circuit comprises a detecting transformer with at least one detection winding connected on the secondary side of the transformer for the inductive decoupling of the actual signal.

By preference, one detection winding is provided on the secondary side of the transformer when the rectifier circuit is embodied as a full-bridge rectifier. in this context, two detection windings are provided on the secondary side of the transformer when the rectifier circuit is embodied as a mid-point rectifier.

By preference, the actual signal is supplied to the control circuit via an evaluation circuit.

By preference, the evaluation circuit comprises a rectifier.

By preference, the evaluation circuit is embodied in such a manner that one or both polarities of the inductively decoupled actual signal are supplied to the control circuit.

By preference, the control circuit controls the switches of the clocked circuit without galvanic separation.

By preference, the control circuit is an ASIC or microcontroller.

By preference, no signal from the primary side of the transformer, that is, from the side of the transformer facing towards the clocked circuit, is fed back to the control circuit.

In summary, the invention relates to a driver circuit or respectively to an LED driver, in which, for example, a so-called LLC resonant circuit is used. In this context, a half-bridge circuit supplies a resonant circuit, which supplies the LED series via a galvanic separation in the form of, for example, a transformer and a rectifier circuit. According to the invention, no buck converter (DC/DC converter) or other clocked converters are provided on the secondary side of the transformer.

Different circuit topologies are provided, because, according to the invention, there are different possibilities for tapping the secondary winding of the transformer and supplying this voltage in a rectified manner to the LED series.

In general, the goal with the embodiments according to the invention is to have on the primary side as few feedbacks to the control circuit electrically isolated from the secondary side as possible and, in this context, to dispense with cost-intensive optocouplers.

The transformer decoupling according to the invention and the concrete evaluation of this AC transformer signal can be implemented in different ways. According to the invention, it is significant that a signal is decoupled from a transformer on the secondary side of the transformer and supplied, optionally processed, to the primary-side control circuit, which, in turn, clocks the power switches of the half-bridge. In this manner, the control loop is closed.

BRIEF DESCRIPTION OF THE DRAWINGS

In the following, the invention is described further with regard to the drawings.

DETAILED DESCRIPTION OF THE PREFERRED EMBODIMENTS

Figure 1:
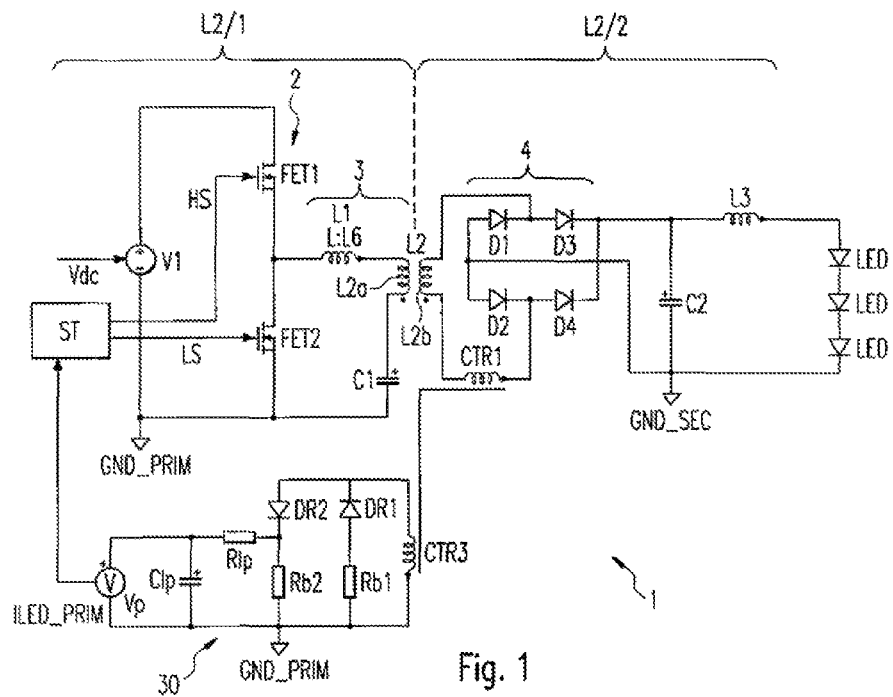
FIG. 1 shows schematically the construction of a driver circuit according to the invention for the supply of an LED series.

FIG. 1 shows an exemplary embodiment of a driver circuit 1 for the supply of illuminants, especially in the form of an of an LED converter for the supply of LEDs or respectively of an LED series.

The driver circuit 1 is fed from an input voltage Vdc. The input voltage Vdc is preferably a rectified and optionally filtered AC voltage or respectively mains voltage. By preference, this rectified mains voltage is then supplied to a converter in the form of, for example, a power-factor correction circuit (not illustrated), before it supplies the driver circuit 1. The input voltage Vdc in this case is an approximately constant bus voltage, optionally comprising a residual waviness. Alternatively, the input voltage Vdc can also a DC voltage or respectively a constant voltage, such as a battery voltage.

At the input end of the driver circuit 1, a switching controller is provided, which is fed from the input voltage Vdc. In particular, the input voltage Vdc supplies a clocked circuit or respectively an inverter, which can be embodied, for example, in the form of a half-bridge circuit 2. The illustrated half-bridge circuit 2 comprises a lower-potential switch FET 2 and a higher-potential switch FET 1. According to the invention, the inverter 2 comprises at least one switch. For example, a flyback converter (not illustrated) can be provided as alternating converter with a switch.

The two switches FET1, FET2 of the half-bridge circuit 2 can be embodied as transistors, for example FET or MOSFET. The switches FET1, FET2 are controlled by respective control signals HS, LS, starting from a control circuit ST. The lower potential switch FET2 is connected to a primary-side ground GND_PRIM. The input voltage Vdc is applied to the half-bridge circuit 2.

At the mid-point the half-bridge circuit 2, that is, between the two switches FET1, FET2, a resonant circuit 3, for example, in the form of a series resonant circuit, is connected. Alternatively, according to the invention, a parallel resonant circuit can also be connected at the mid-point of the half-bridge circuit 2. The resonant circuit 3 shown in FIG. 1 is embodied as a series resonant circuit and comprises inductance and capacitance elements. In particular, a series circuit comprising a first coil L1, a second coil L2a and a capacitor C1 is connected between primary-side ground GND_PRIM and the mid-point of the half-bridge circuit. In this case, the resonant circuit 3 is designated as an LLC resonant circuit. The capacitor C1 and the coil L1 preferably form an LC resonant circuit.

The second coil L2a is preferably the primary winding of a transformer L2, which serves as transmitter for the galvanic separation. The transformer L2 is an example of a galvanic barrier. In FIG. 1, the transformer L2 is illustrated as an ideal transformer, wherein the primary winding of the real transformer L2 can comprise a leakage inductance and a primary inductance in order to conduct the magnetisation current.

The transformer L2 as a whole forms a galvanic barrier 5 between the primary side L2/1 comprising the primary winding L2a and a secondary side L2/2 comprising the secondary winding L2b of the transformer L2.

This secondary winding L2b of the transformer L2 is supplied to a rectifier 4, which is formed in the exemplary embodiment of FIG. 1 as a bridge rectifier or respectively full-bridge rectifier with four connected diodes D1, D2, D3, D4. This embodiment with four diodes D1, D2, D3, D4 is exemplary for a passive rectifier. Alternatively, the rectifier can be embodied as an active rectifier, especially with switches, for example, in the form of MOSFETs.

The full-bridge rectifier bridge rectifier feeds a storage capacitor C2 at the output end starting from a secondary-side ground GND_SEC. An electrolytic capacitor can preferably be used as the storage capacitor C2 because of its comparatively high capacitance.

The illuminants, preferably LEDs or respectively an LED series, are connected in parallel to the storage capacitor C2. In FIG. 1, the illustrated LED is supposed to be representative for one or more LEDs. By preference, the LED series driven by the driver circuit 1 can comprise a series circuit of several LEDs. Alternatively, LEDs arranged in parallel or a combination of LEDs arranged in parallel and in series can be supplied.

At the output of the rectifier circuit 4 or respectively of the storage capacitor C2, further components can be provided for filtering. For example, a coil L3 is shown in FIG. 1 for this purpose. This coil L3 is arranged in series to the LEDs, wherein this series circuit is connected in parallel to the capacitor C2.

An AC current, that is, an alternating current, flows through the secondary winding L2b of the transistor L2 during operation. According to the invention, it is now proposed to transform this alternating current into a primary-side current, via a detection winding CTR1 provided on the secondary side L2/2. This detection winding CTR1 is coupled for this purpose with a primary-side detection winding CTR3.

The secondary-side detection winding CTR1 is arranged in series to the secondary winding L2b of the transformer L2. By preference, the detection winding CTR1 is connected between the secondary winding L2b and the rectifier circuit 4, that is, between a terminal of the secondary winding L2b and an input terminal of the rectifier circuit 4.

According to a preferred embodiment, the secondary winding L2b and the detection winding CTR1 are embodied as separate windings. That is, the secondary winding L2b and the detection winding CTR1 form two separate transformers. This results, in particular, from the requirement that the detecting transformer CTR1, CTR3 is embodied as a current transformer. The windings of the detecting transformer CTR1, CTR3 are, in particular, embodied to allow the most loss-free possible detection of the secondary-side alternating current. Through appropriate selection of the windings, the detecting transformer CTR1, CTR3 embodied as a current transformer can comprise a lowest possible impedance.

The current through the detection winding CTR1 reproduces the current through the LEDs. If the optional storage capacitor C2 is not provided in the driver circuit 1, the current through the detection winding CTR1 in fact also flows through the LEDs. If the capacitor C2 used for filtering is connected, the electrical energy which it temporarily buffers is rerouted back to the load, that is, to the LEDs. Whether with or without storage capacitor C2, the mean value of the LED current remains the same, and the detection winding CTR1 reproduces the LED current.

The AC current through the detection winding CTR1 correspondingly generates an AC current in the primary-side detection winding CTR3. An evaluation circuit 30 is connected to the primary-side detection winding CTR3, in order to generate a measurement value ILED_PRIM for the current through the LEDs. This measurement value ILED_PRIM is fed back to the control circuit ST. On the basis of the feedback value obtained, the control circuit ST generates the control signals HS, LS for the switches FET1, FET2, wherein these switches can be switched on and off alternately. Starting from the actual value ILED_PRIM, the control circuit ST implements a current control to a desired set value by clocking the half-bridge circuit 2 correspondingly.

The evaluation circuit 30 used in the exemplary embodiment of FIG. 1 is explained in greater detail in the following in conjunction with FIG. 3.

Figure 2:
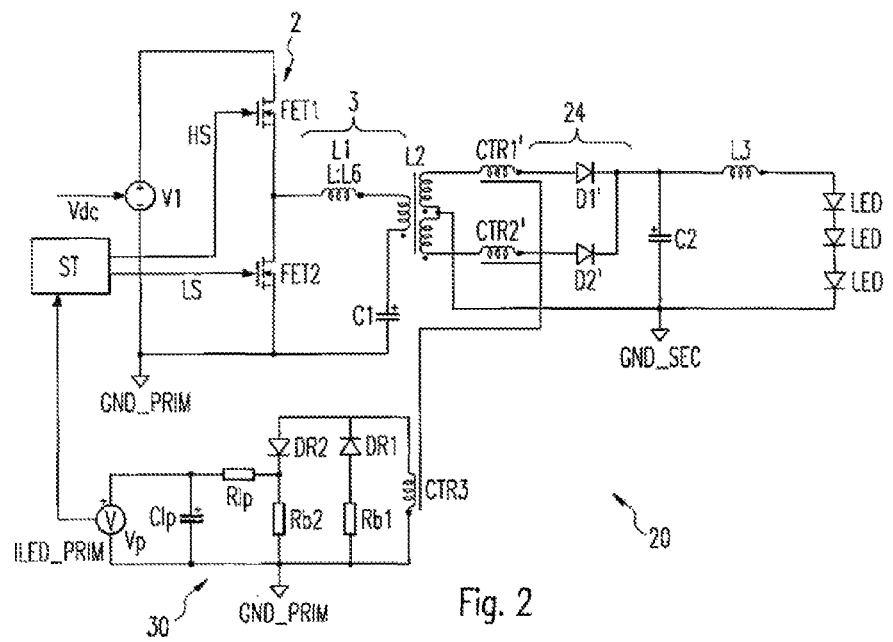
FIG. 2 shows a further exemplary embodiment according to the invention of a driver circuit for the supply of an LED series.

FIG. 2 shows a further exemplary embodiment for a driver circuit 20 for illuminants, for example, LEDs.

The driver circuit 20 corresponds in principle to the driver circuit 1 shown in FIG. 1 and correspondingly comprises the half-bridge circuit 2 and the resonant circuit 3. However, the driver circuit 20 differs from the exemplary embodiment of FIG. 1 through the embodiment of the transformer and the rectifier circuit 24.

The secondary winding L2b of the transformer L2 comprises a tapping into or respectively a tapping from, especially a central tapping or respectively mid-point tapping. This central tapping forms a potential of the output voltage of the rectifier circuit 24, namely, the secondary-side ground GND_SEC.

A terminal of the secondary winding L2b is connected to the anode of a first diode D1', and the other terminal of the secondary winding L2b to the anode of a second diode D2'. The respective cathodes of the diodes D1', D2' are combined and form the other output potential of the rectifier circuit 24, which is preferably connected to the storage capacitor C2. This rectifier 24 can be designated as a mid-point rectifier.

By way of difference from the exemplary embodiment of FIG. 1, two secondary-side detection windings CTR1', CTR2' are now necessary in order to guarantee a correct detection of the alternating current on the secondary side L2/2. Dependent upon the direction of the AC current, a current will flow through the first or through the second diode D1', D2'. For the complete detection of the current through the LEDs, the first detection winding CTR1' is connected in series to the first diode D1', and the second detection winding CTR2' in series to the second diode D2'.

As shown in FIG. 2, the two secondary-side detection windings CTR1', CTR2' are coupled with the primary-side detection winding CTR3. Independently of the embodiment of the driver circuit according to the exemplary embodiment of FIG. 1 or of FIG. 2, the same current is obtained in total in the primary-side detection winding CTR3.

In a similar manner to FIG. 1, the detecting transformer formed by the windings CTR1', CTR2', CTR3 is embodied as a current transformer. By preference, the detection windings CTR1', CTR2' are also embodied separately from the transformer L2.

By comparison with the exemplary embodiment of FIG. 2, more diodes are necessary in the embodiment according to FIG. 1—the four diodes D1, D2, D3, D4 by comparison with two diodes D1', D2. However, the driver circuit 1 comprises a single secondary-side detection winding CTR1, by comparison with the two windings CTR1', CTR2' of the driver circuit 20 with mid-tapping.

Figure 3:
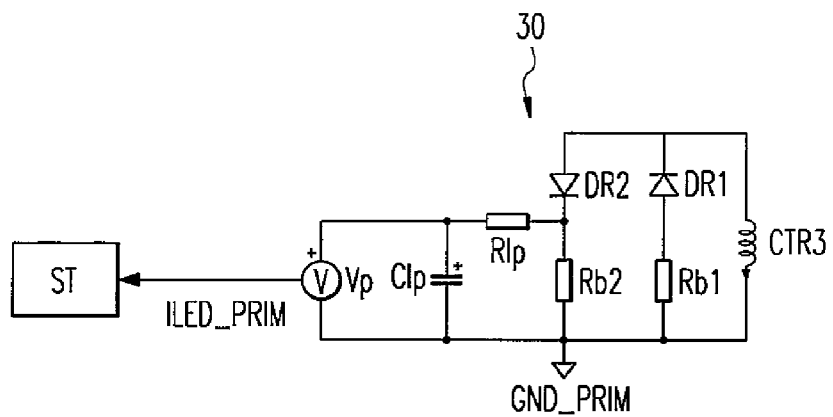
FIG. 3 shows a first exemplary embodiment of an evaluation circuit for the feedback of an actual signal.

FIG. 3 shows an embodiment of the evaluation circuit 30 as it occurs in the driver circuits 1, 20 of FIGS. 1, 2.

The evaluation circuit 30 serves in principle to evaluate or respectively to process and then to feedback to the control circuit ST the information about the current through the LEDs supplied from the detection winding CTR3. In this context, in order to determine the current through the secondary-side L2/2, the control circuit ST should, in particular, take into consideration the ratio of the winding numbers of the windings CTR1, CTR3 or CTR1', CTR2', CTR3, wherein, in the exemplary embodiment of FIG. 2, the winding numbers of the secondary-side detection windings CTR1', CTR2' are preferably the same.

Two series circuits comprising respectively a diode DR1, DR2 and a resistor or respectively measurement resistor Rb1, Rb2 are connected in parallel to the detection winding CTR3. The resistors Rb1, Rb2 are each connected to the primary-side ground GND_PRIM. A diode DR2 is connected with its anode to a terminal of the detection winding CTR3, the other diode DR1 is connected with its cathode to this terminal. The diodes DR1, DR2 or respectively the corresponding series circuits are connected in an anti-parallel manner.

The evaluation circuit 30 is embodied in such a manner that only the half wave of the current detected by the detection winding CTR3 is evaluated and fed back to the control circuit ST.

By preference, the current through the LEDs is evaluated via the voltage at one of the resistors Rb1, Rb2.

In the exemplary embodiment of FIG. 3, the voltage at the resistor Rb2 is taken into consideration. Alternatively, the voltage at the other resistor Rb2 could also be taken into consideration.

As shown in FIG. 3, the voltage reproducing the LED current is supplied to an RC element. The RC element comprises a resistor Rlp and a capacitor Clp and serves for the low-pass filtering of the measured voltage at the resistor Rb2. Accordingly, a mean value of the current through the LEDs is fed back to the control circuit ST. This RC element is optional, so that the voltage at the resistor Rb2 can also be taken as the feedback value ILED_PRIM.

Figure 4:
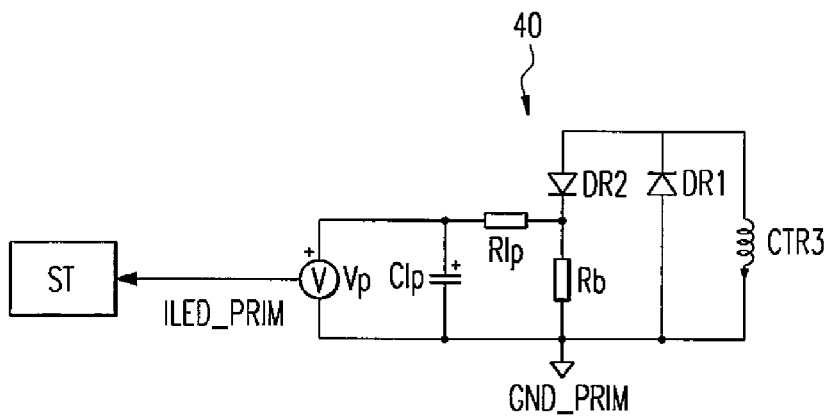
FIG. 4 shows a further exemplary embodiment for an evaluation circuit according to the invention.

FIG. 4 shows a further embodiment of the evaluation circuit 40. This evaluation circuit 40 can replace, for example, the evaluation circuit 30 in FIGS. 1 and 2.

The only difference here from the embodiment shown in FIG. 3 is the omission of the resistor Rb1 of which the voltage is not measured in FIG. 3.

The functioning of the evaluation circuit 40 is therefore similar in that only a half wave of the current detected through the detection winding CTR3 is evaluated and rerouted to the control circuit ST as the actual signal ILED_PRIM.

With the evaluation circuit 40, therefore, one component—the resistor RB1—is saved. However, by comparison with FIG. 3, this embodiment is also disadvantageous in that both half waves are not symmetrically loaded.

However, in FIG. 3, both half waves are advantageously symmetrically loaded by the resistors Rb1, Rb2, especially if both resistors Rb1, Rb2 comprise the same electrical resistance. The symmetrical loading of the current through the secondary side and accordingly through the resonant circuit 3 achieved in this manner is advantageous for the good operation of the driver circuit.

Figure 5:
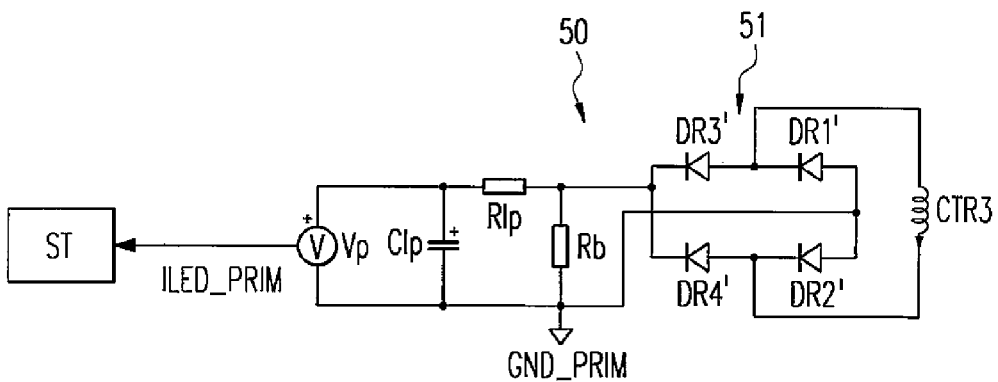
FIG. 5 shows a further exemplary embodiment according to the invention of an evaluation circuit for the feedback of the actual signal.

FIG. 5 shows yet another embodiment of the evaluation circuit 50, which can also be used in a driver circuit 1, 20 as shown in FIG. 1 or 2.

By contrast with FIGS. 3 and 4, both half waves are evaluated here. Accordingly, the detection winding CTR3 is configured with a full-bridge rectifier 51, which preferably comprises four diodes DR1', DR2', DR3', DR4'. In this manner, both the positive and also the negative half waves of the AC current are rerouted or respectively rectified through the winding CTR3 by the rectifier 51.

At the output of the full-bridge rectifier 51, once again, a resistor or respectively measurement resistor Rb is connected, which reproduces the current through the secondary side and through the LEDs. After the optional low-pass filtering through the RC element Rlp, Clp, the actual signal ILED_PRIM is fed back to the control circuit.

With the evaluation circuit 50, both half waves of the AC current are therefore advantageously evaluated. The main advantage in this context is that the LED current measurement is now more accurate and that a linear correlation exists between the LED current and the fed back parameter ILED_PRIM. The uncertainty relating to the measurement associated with a possible variable magnetisation current is therefore removed with the evaluation circuit 50.

In the case of the solution with the full-bridge rectifier 51, it is disadvantageous that it is the most costly embodiment of the three evaluation circuits illustrated in FIGS. 3-5 with regard to the components used.

For example, the detecting transformer can comprise a winding-number ratio of 1:60. The resistors Rb1, Rb2, Rb used in FIGS. 3-5 for the evaluation of the AC current comprise, for example, a value of 60 ohms. For the low-pass filtering, the resistor Rlp and the capacitor Clp comprise, for example, a respective value of 130 ohms and respectively 220 nF.

By preference, no further measurement signal from the primary side of the resonant circuit 3, especially preferably no measurement signal which reproduces the current through the half-bridge circuit 2 is supplied to the control circuit ST on the primary side L2/1. In particular, no measurement resistor is connected in series to the primary winding L2a or respectively in series to the resonant circuit 3.

Additionally, or alternatively, for the control of the current through the LEDs, given error states can also be detected via the named measurement of the actual signal ILED_PRIM. In particular, the error state "no load" can be determined, wherein, in this error state, no current flows on the secondary side L2/2. For example, this error state can mean that no load or respectively no LEDs are present or that the LEDs or respectively the LED series are faulty.

Accordingly, on the basis of the actual signal ILED_PRIM, the control circuit can also detect an error state on the secondary side L2/2 of the transformer L2 and/or an error state of the illuminants or respectively of the LEDs. Dependent upon this, the control circuit ST can output and, for example, reroute an error signal to a central monitoring unit (not illustrated). Dependent upon such error states, the control circuit ST can also vary the control of the inverter or respectively of the half bridge 2.

The invention claimed is:

1. A driver circuit (1, 20) for at least one illuminant comprising:
    a clocked circuit (2) clocked by means of at least one switch (FET1, FET2), which feeds a resonant circuit (3),
    a transformer (L2) following the resonant circuit (3), starting from a secondary winding (L2b) of which the at least one illuminant can be supplied, and
    a control circuit (ST) which clocks the switches (FET1, FET2) of the clocked circuit (2), wherein an actual signal (ILED_PRIM) indirectly reproducing a current through the at least one illuminant, which is inductively decoupled on the secondary side (L2/2) of the transformer (L2), is fed back to the control circuit (ST), wherein the control circuit (ST) is embodied:
to control the current through the at least one illuminant, to clock at least one switch (FET1, FET2) of the clocked circuit (2) dependent upon the actual signal (ILED_PRIM), and/or on the basis of the actual signal (ILED_PRIM), to detect an error state following the secondary winding (L2b) of the transformer (L2) and/or of the at least one illuminant, and dependent upon the basis of the actual signal (ILED_PRIM), to output an error signal and/or to vary the control of the clocked circuit (2), wherein the secondary winding (L2b) of the transformer (L2) feeds a rectifier circuit (4, 24) and the actual signal (ILED_PRIM) is decoupled on the secondary side before the rectificaction.

2. The driver circuit according to claim 1, wherein the rectifier circuit is embodied as a full-bridge rectifier (4) or mid-point rectifier (24).

3. The driver circuit according to claim 1, in which the actual signal of the control circuit (ST) is supplied via an evaluation circuit (30, 40, 50).

4. The driver circuit according to claim 3, in which the evaluation circuit (30, 40, 50) comprises a rectifier.

5. The driver circuit according to claim 3, in which the evaluation circuit (30, 40, 50) is embodied in such a manner that one or both polarities of the inductively decoupled actual signal are supplied to the control circuit (ST).

6. The driver circuit according to claim 1, in which the control circuit (ST) controls the switches (FET1, FET2) of the clocked circuit (2) without galvanic separation.

7. The driver circuit according to claim 1, in which the control circuit (ST) is an ASIC or microcontroller.

8. The driver circuit according to claim 1, in which no signal from the primary side (L2/1) of the transformer (L2), that is, the side of the transformer (L2) facing towards the clocked circuit (2), is fed back to the control circuit (ST).

9. An LED module, comprising a driver circuit (1, 20) according to claim 1 and at least one LED series supplied by the driver circuit (1, 20) which comprises at least one LED.

10. The driver circuit of claim 1, wherein the at least one switch (FET1, FET2) is an inverter in the form of a half-bridge circuit.

11. A driver circuit (1, 20) for at least one illuminant comprising:
a clocked circuit (2) clocked by means of at least one switch (FET1, FET2), which feeds a resonant circuit (3),
a transformer (L2) following the resonant circuit (3), starting from a secondary winding (L2b) of which the at least one illuminant can be supplied, and
a control circuit (ST) which clocks the switches (FET1, FET2) of the clocked circuit (2), wherein an actual signal (ILED_PRIM) indirectly reproducing a current through the at least one illuminant, which is inductively decoupled on the secondary side (L2/2) of the transformer (L2), is fed back to the control circuit (ST),
wherein the control circuit (ST) is embodied:
to control the current through the at least one illuminant, to clock at least one switch (FET1, FET2) of the clocked circuit (2) dependent upon the actual signal (ILED_PRIM), and/or
on the basis of the actual signal (ILED_PRIM), to detect an error state following the secondary winding (L2b) of the transformer (L2) and/or of the at least one illuminant, and dependent upon the basis of the actual signal (ILED_PRIM), to output an error signal and/or to vary the control of the clocked circuit (2)
wherein the driver circuit further comprises a detecting transformer with at least one detection winding (CTR1, CTR1', CTR2') connected on the secondary side of the transformer (L2) for the inductive decoupling of the actual signal.

12. The driver circuit according to claim 11, wherein, on the secondary side of the transformer (L2), a detection winding (CTR1) is provided when the rectifier circuit is embodied as a full-bridge rectifier (4), and two detection windings (CTR1', CTR2') are provided when the rectifier circuit is embodied as a mid-point rectifier (24).

13. A luminaire comprising a driver circuit (1, 20) and a rectifier connected upstream for the rectification of a mains voltage and a DC/DC converter for the supply of the driver circuit (1, 20) starting from the rectified mains voltage, wherein the driver circuit (1, 20) comprises:
a clocked circuit (2) clocked by means of at least one switch (FET1, FET2), which feeds a resonant circuit (3),
a transformer (L2) following the resonant circuit (3), starting from a secondary winding (L2b) of which the at least one illuminant can be supplied, and
a control circuit (ST) which clocks the switches (FET1, FET2) of the clocked circuit (2), wherein an actual signal (ILED_PRIM) indirectly reproducing a current through the at least one illuminant, which is inductively decoupled on the secondary side (L2/2) of the transformer (L2), is fed back to the control circuit (ST),
wherein the control circuit (ST) is embodied:
to control the current through the at least one illuminant, to clock at least one switch (FET1, FET2) of the clocked circuit (2) dependent upon the actual signal (ILED_PRIM), and/or
on the basis of the actual signal (ILED_PRIM), to detect an error state following the secondary winding (L2b) of the transformer (L2) and/or of the at least one illuminant, and dependent upon the basis of the actual signal (ILED_PRIM), to output an error signal and/or to vary the control of the clocked circuit (2).

14. The luminaire of claim 13, wherein the DC/DC converter is a power-factor-correction circuit.

* * * * *